United States Patent
Reynolds

[19]
[11] Patent Number: 6,077,166
[45] Date of Patent: Jun. 20, 2000

[54] DUST GUARD AND CROSS ASSEMBLY FOR A UNIVERSAL JOINT

[75] Inventor: James T. Reynolds, Toledo, Ohio

[73] Assignee: Dana Corporation, Toledo, Ohio

[21] Appl. No.: 09/093,456

[22] Filed: Jun. 8, 1998

[51] Int. Cl.[7] ................................. F16D 3/16
[52] U.S. Cl. ........................................ 464/133
[58] Field of Search .................. 464/7, 11, 14, 464/128, 131, 133; 277/562, 634, 635

[56] References Cited

U.S. PATENT DOCUMENTS

| | | |
|---|---|---|
| 771,637 | 10/1904 | Hoffmann . |
| 2,773,367 | 12/1956 | Slaght ................................. 464/11 |
| 3,091,948 | 6/1963 | Zeller ................................. 464/131 |
| 3,266,269 | 8/1966 | Stokely . |
| 3,377,820 | 4/1968 | Smith, Jr. ........................... 464/14 |
| 3,832,865 | 9/1974 | Lewis . |
| 3,846,995 | 11/1974 | Mangiavacchi . |
| 4,310,206 | 1/1982 | Weible ............................... 464/11 |
| 4,366,996 | 1/1983 | Grandel ............................. 464/11 |
| 4,512,672 | 4/1985 | Olschewski et al. ............... 277/562 |
| 4,515,574 | 5/1985 | Mazziotti .......................... 464/131 |
| 4,524,677 | 6/1985 | Ashman et al. ................... 277/634 |
| 4,861,315 | 8/1989 | Mazziotti .......................... 464/14 |
| 4,874,349 | 10/1989 | Gall ................................. 464/131 |
| 5,588,915 | 12/1996 | Smith ............................... 464/14 |
| 5,716,277 | 2/1998 | Reynolds .......................... 464/11 |
| 5,769,723 | 6/1998 | Faulbecker et al. ............... 464/11 |

*Primary Examiner*—Anthony Knight
*Assistant Examiner*—Greg Binda
*Attorney, Agent, or Firm*—MacMillan, Sobanski & Todd, LLC

[57] ABSTRACT

A structure for positively retaining the bearing cups on the trunnions of a universal joint cross prior to assembly into a vehicle includes a cross having a body portion with a plurality of trunnions extending outwardly therefrom. Each of the trunnions has an annular ridge formed thereon defining an increased outer diameter. A bearing cup is rotatably mounted on each of the trunnions. Each of the bearing cups has a rigid dust guard attached thereto. Each of the dust guards has an inwardly extending portion that defines an inner diameter. The inner diameters defined by the inwardly extending portions of the dust guards are smaller than the outer diameters defined by the annular ridges. Thus, during installation, the inwardly extending portions of the dust guards snap over the outwardly extending ridges formed on the trunnions. In this manner, the bearing cups are positively retained on the trunnions during shipment.

20 Claims, 3 Drawing Sheets

DUST GUARD AND CROSS ASSEMBLY FOR A UNIVERSAL JOINT

BACKGROUND OF THE INVENTION

This invention relates in general to universal joints and in particular to an improved structure for positively retaining the bearing cups on the trunnions of a universal joint cross prior to assembly into a vehicle.

Universal joints are well known devices that provide a driving connection between two members adapted to rotate about non-aligned axes of rotation. Universal joints are widely used to connect rotatable members in vehicle drive train systems. In a typical drive train system, a first universal joint is connected between an output shaft of an engine/transmission assembly and a first end of a driveshaft tube, while a second universal joint is connected between a second end of the driveshaft tube and an input shaft of an axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A typical structure for a universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups mounted on a first opposed pair of the trunnions are connected to a first yoke which, in turn, is secured to one of the rotatable components of the vehicle drive train system. Similarly, the bearing cups mounted on a second opposed pair of the trunnions are connected to a second yoke which, in turn, is secured to a second one of the rotatable components of the vehicle drive train system.

Frequently, the first and second universal joints are manufactured concurrently with the driveshaft tube at a first location, then shipped as a unit to a second location for assembly with the other components of the vehicle drive train system. In such a manufacturing process, yokes are initially secured to the ends of the driveshaft tube, then a universal joint is connected to each of the yokes. Thus, for each of the universal joints, only one opposed pair of the bearing cups is connected to a yoke and, therefore, positively retained on the respective trunnions. The other opposed pair of the bearing cups remains mounted on the respective trunnions, but is not positively retained thereon. Following installation on the yokes, each of the universal joints is purged with lubricant. Such purging is well known in the art and involves the injection of lubricant within the cross at a relatively high pressure. The lubricant passes through bores formed through each of the trunnions so as to move into the regions of the bearings disposed between the bearing cups and the trunnions.

It is known to provide elastomeric seals about the open ends of the bearing cups to retain lubricant in the region between the outer surface of the trunnion and the inner surface of the bearing cup where the roller bearings are located. The elastomeric seals also function to prevent the entry of dirt and other contaminants into the regions where the roller bearings are located. Additionally, it is known to provide rigid dust guards about the open ends of the bearing cups to protectively cover the elastomeric seals, and further to prevent the entry of dirt and other contaminants into the regions where the roller bearings are located. In some instances, the elastomeric seal and rigid dust guard have been combined into a single seal and dust guard assembly.

In the past, the rigid dust guards have been utilized to retain the bearing cups on the trunnions during shipment from the manufacturing facility to the assembly facility, as described above. To accomplish this, it is known to form the dust guard having a first portion that frictionally engages the outer surface of the trunnion and a second portion that engages an annular groove formed in the outer surface of the bearing cup. Although this structure has been generally effective, it has been found that the bearing cups can still become dislodged during shipment if a large impact is applied thereto. Even if the bearing cups are not removed from the trunnions as a result of these impacts, they may become misaligned therewith. Such misalignment is undesirable because it can result in non-uniform sealing pressures being exerted against the trunnions, resulting in non-uniform lubricant injection during the purging process. Thus it would be desirable to provide an improved structure for positively retaining the bearing cups on the trunnions of a universal joint cross prior to assembly.

SUMMARY OF THE INVENTION

This invention relates to an improved structure for positively retaining the bearing cups on the trunnions of a universal joint cross prior to assembly into a vehicle. A cross includes a body portion having a plurality of trunnions extending outwardly therefrom. Each of the trunnions has an annular ridge formed thereon defining an increased outer diameter. A bearing cup is rotatably mounted on each of the trunnions. Each of the bearing cups has a rigid dust guard attached thereto. Each of the dust guards has an inwardly extending portion that defines an inner diameter. The inner diameters defined by the inwardly extending portions of the dust guards are smaller than the outer diameters defined by the annular ridges. Thus, during installation, the inwardly extending portions of the dust guards snap over the outwardly extending ridges formed on the trunnions. In this manner, the bearing cups are positively retained on the trunnions during shipment.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
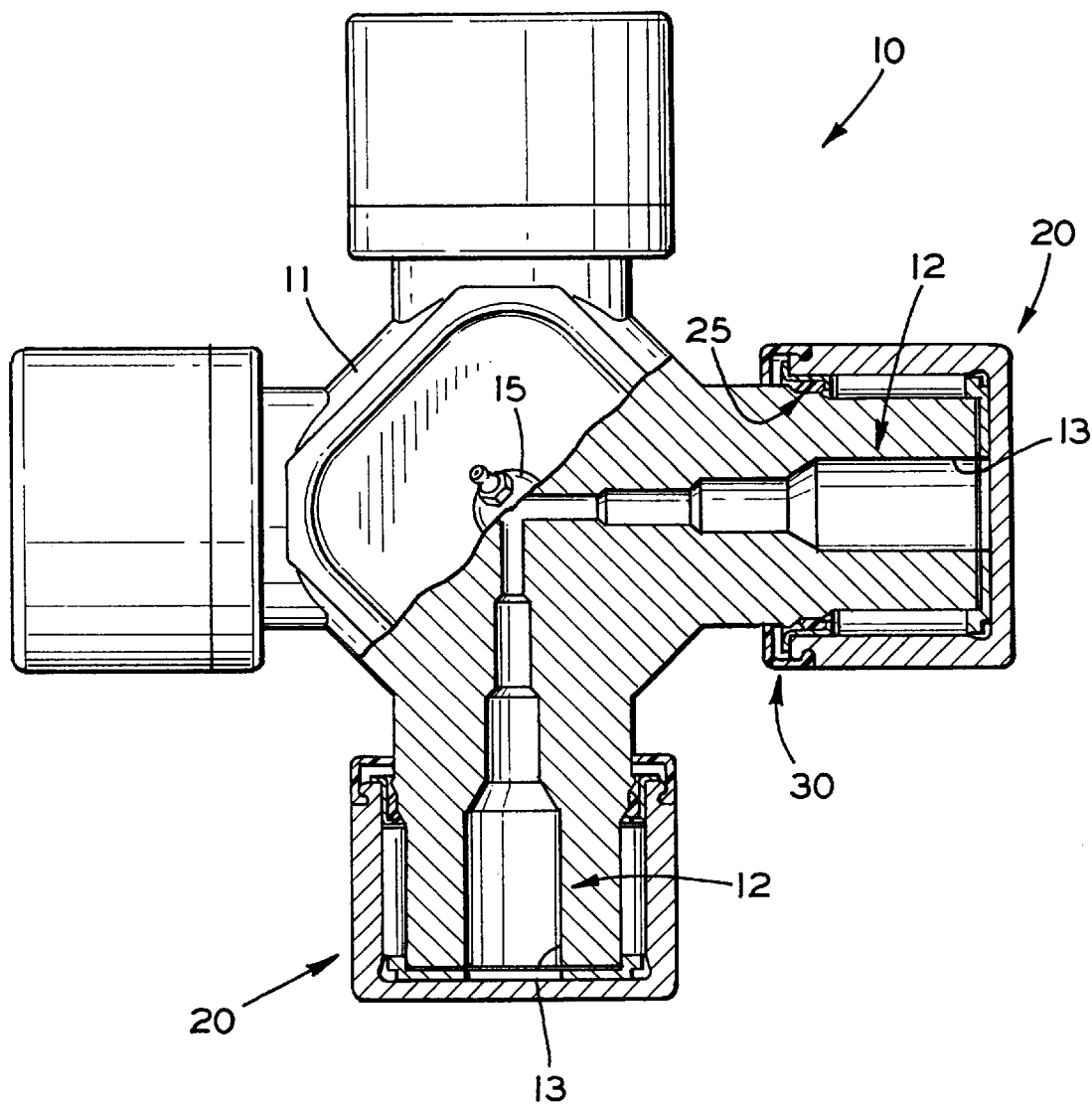
FIG. 1 is an elevational view, partially in cross section, of a cross for a universal joint in accordance with this invention.

Referring now to the drawings, there is illustrated in FIG. 1 a cross, indicated generally at 10, in accordance with this invention. The cross 10 is adapted to form a portion of a conventional universal joint (not shown). The cross 10 includes a central body portion 11 having a plurality of trunnions, indicated generally at 12, extending outwardly from the body portion 11. In the illustrated embodiment, four of such trunnions 12 are formed integrally with the body portion 11. The trunnions 12 are disposed at right angles relative to one another and are oriented so as to lie in a single plane. The trunnions 12 are generally hollow and cylindrical in shape and define respective axes through the trunnions 12.

Figure 2:
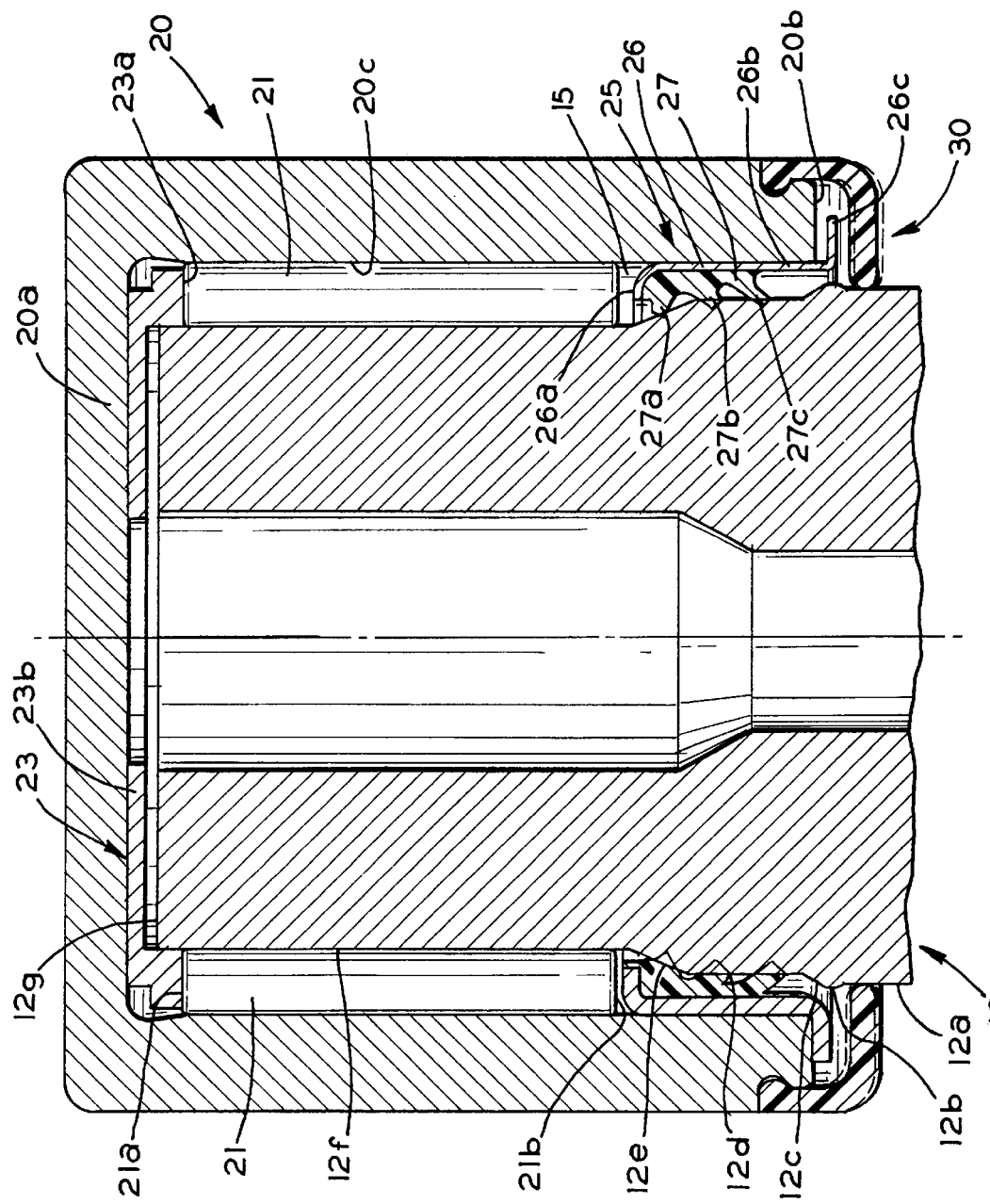
FIG. 2 is an enlarged sectional elevational view of one of the trunnions of the cross illustrated in FIG. 1.

As best shown in FIG. 2, each of the trunnions 12 includes a cylindrical outer friction surface 12a that extends axially outwardly from the body portion 11 of the cross 10. An annular ridge 12b is formed in the friction surface 12a at or near the axially outer end thereof. A first tapered surface 12c extends axially outwardly from the annular ridge 12b. The first tapered surface 12c decreases in diameter as it extends axially outwardly from the friction surface 12a. A cylindrical sealing surface 12d extends axially outwardly from the tapered surface 12c. The sealing surface 12d defines a diameter that is slightly smaller than the diameter defined by the friction surface 12a. A second tapered surface 12e extends axially outwardly from the sealing surface 12d. The second tapered surface 12e also decreases in diameter as it extends axially outwardly from the sealing surface 12d. A cylindrical bearing surface 12f extends axially outwardly from the tapered sealing surface 12e. The bearing surface 12f defines a diameter that is slightly smaller than the diameter defined by the sealing surface 12d. The bearing surface 12f terminates at an axially outer end surface 12g of the trunnion 12.

A bearing cup, indicated generally at 20, is mounted about each of the trunnions 12 of the cross 10. Each of the bearing cups 20 is generally hollow and cylindrical in shape, including a closed end 20a, an open end 20b, and a smooth inner cylindrical bearing surface 20c. When mounted about the trunnion 12, the closed end 20a of the bearing cup 20 is disposed adjacent to the axially outer end surface 12g of the trunnion 12, while the inner bearing surface 20c of the bearing cup 20 is disposed concentrically about the outer cylindrical bearing surface 12f of the trunnion 12. The diameter defined by the inner bearing surface 20c of the bearing cup 20 is somewhat larger than the diameter defined by the outer bearing surface 12f of the trunnion 12, thus defining an annular space 15 therebetween. A plurality of conventional roller bearings 21 (only two are illustrated) are disposed in the annular space 15 in a circumferential array about the trunnion 12. The roller bearings 21 have axially outer ends 21a located adjacent to the closed end 20a of the bearing cup 20 and axially inner ends 21b located adjacent to the open end 20b of the bearing cup 20. As is well known, the roller bearings 21 are provided to facilitate rotational movement of the bearing cup 20 relative to the trunnion 12.

An annular thrust washer, indicated generally at 23, is provided between the axially outer end surface 12g of the trunnion 12 and the inner surface of the closed end 20a of the bearing cup 20. The thrust washer 23 is conventional in the art and is provided to reduce the amount of friction between the trunnion 12 and the associated bearing cup 20 when relative rotation occurs. The thrust washer 23 also reduces the amount of friction between the roller bearings 21 and the associated bearing cup 20. Moreover, the thrust washer 23 enables the bearing cup 20 to fit tightly on the trunnion 12 to prevent the cross 10 and trunnion 12 from endwise movement relative to the bearing cup 20 during operation, thereby reducing the amount of undesirable noise and vibration.

An annular seal, indicated generally at 25, is provided about the open end 20b of each of the bearing cups 20. The seal 25 is conventional in the art and includes a metallic support ring 26 and an elastomeric seal 27. The illustrated support ring 26 is generally S-shaped in cross section (although such is not required) and includes a radially inwardly extending flange portion 26a, an axially extending body portion 26b, and a radially outwardly extending flange portion 26c. The central portion 26b defines an outer diameter that is slightly larger than an inner diameter defined by the inner bearing surface 20c of the bearing cup 20. Thus, the support ring 26 can be pressed into the inner bearing surface 20c and retained within the bearing cup 20 by friction. The elastomeric seal 27 is attached to the support ring 26 by any conventional means, such as by adhesive bonding. The illustrated elastomeric seal 27 includes a plurality of sealing lips 27a, 27b, and 27c (although such is not required) that extend radially inwardly into engagement with the sealing surface 12d and the second tapered surface 12e of the trunnion 12. As best shown in FIG. 2, the sealing lips 27a, 27b, and 27c may extend in different axial directions if desired.

An annular dust guard, indicated generally at 30, is removably secured about the open end 20b of each of the bearing cups 20. The illustrated dust guard 30 is generally L-shaped in cross section (although such is not required) defined by an axially extending outer portion 30a and a radially extending inner portion 30b. The axially extending outer portion 30a of the dust guard 30 terminates in an annular flange 30c that extends radially inwardly into an annular groove 20e formed in the outer surface of the bearing cup 20. The flange 30c defines an inner diameter that is smaller than the outer diameter of the open end 20b of the bearing cup 20. Thus, the cooperation of the flange 30c with the groove 20e retains the dust guard 30 on the bearing cup 20.

The radially extending portion 30b of the dust guard 30 extends radially inwardly toward the trunnion 12 and terminates in an inner friction surface 30d. Preferably, the inner friction surface 30d is generally semi-circular in cross sectional shape, although other shapes may be used if desired. The inner diameter defined by the inner friction surface 30d is slightly smaller than the outer diameter defined by the friction surface 12a of the trunnion 12. Thus, the inner friction surface 30d of the dust guard 30 frictionally engages the friction surface 12a of the trunnion 12. The inner diameter defined by the inner friction surface 30d is substantially smaller than the outer diameter defined by the annular ridge 12b extending from the trunnion 12. Thus, the inner friction surface 30d of the dust guard 30 is positively retained on the trunnion 12.

The dust guard 30 can be formed from any desired material. Preferably, the dust guard is formed from a relatively stiff, but somewhat flexible, plastic material, such as Xenon 6123M plastic material that is commonly available in the market.

To assemble the bearing cup 20 onto the cross 10, the thrust washer 23 and the roller bearings 21 are initially assembled into the bearing cups 20. The elastomeric seal 25 is then pressed into frictional engagement with the inner bearing surface 20c of the bearing cup 20. Next, the dust guard 30 is snapped onto the open end 20b of the bearing cup 20 by pushing the axially extending portion 30a of the dust guards 30 over the open end 20b until the flange 30c snaps into the groove 20e. When this occurs, the dust guard 30 is retained about the open end 20b of the bearing cup 20. However, because the inner diameter of the axially extending portion 30a of the dust guard 30 is slightly larger than the outer diameter of the open end 20b of the bearing cup 20, the dust guard 30 fits loosely on the bearing cup 20. The bearing cup 20 is next assembled onto the trunnion 12 by positioning the open end 20b thereof adjacent to the axially outer end surface 12g of the trunnion 12. The bearing cup 20 is then moved axially inwardly toward the body portion 11 of the cross 10. Little frictional resistance is initially offered against such movement because the inner diameter of the dust guard 30 is larger than the outer diameters of the bearing surface 12f and the sealing surface 12d of the trunnion 12. When the inner friction surface 30d of the dust guard 30 approaches the annular ridge 12b, additional force must be applied to overcome the interference fit between the inner friction surface 30d of the dust guard 30 and annular ridge 12b. Such additional force causes the inner friction surface 30d to snap over the annular ridge 12b and slide onto the friction surface 12a of the trunnion 12. At this point, the bearing cup 20 is properly positioned relative to the trunnion 12.

Figure 3:
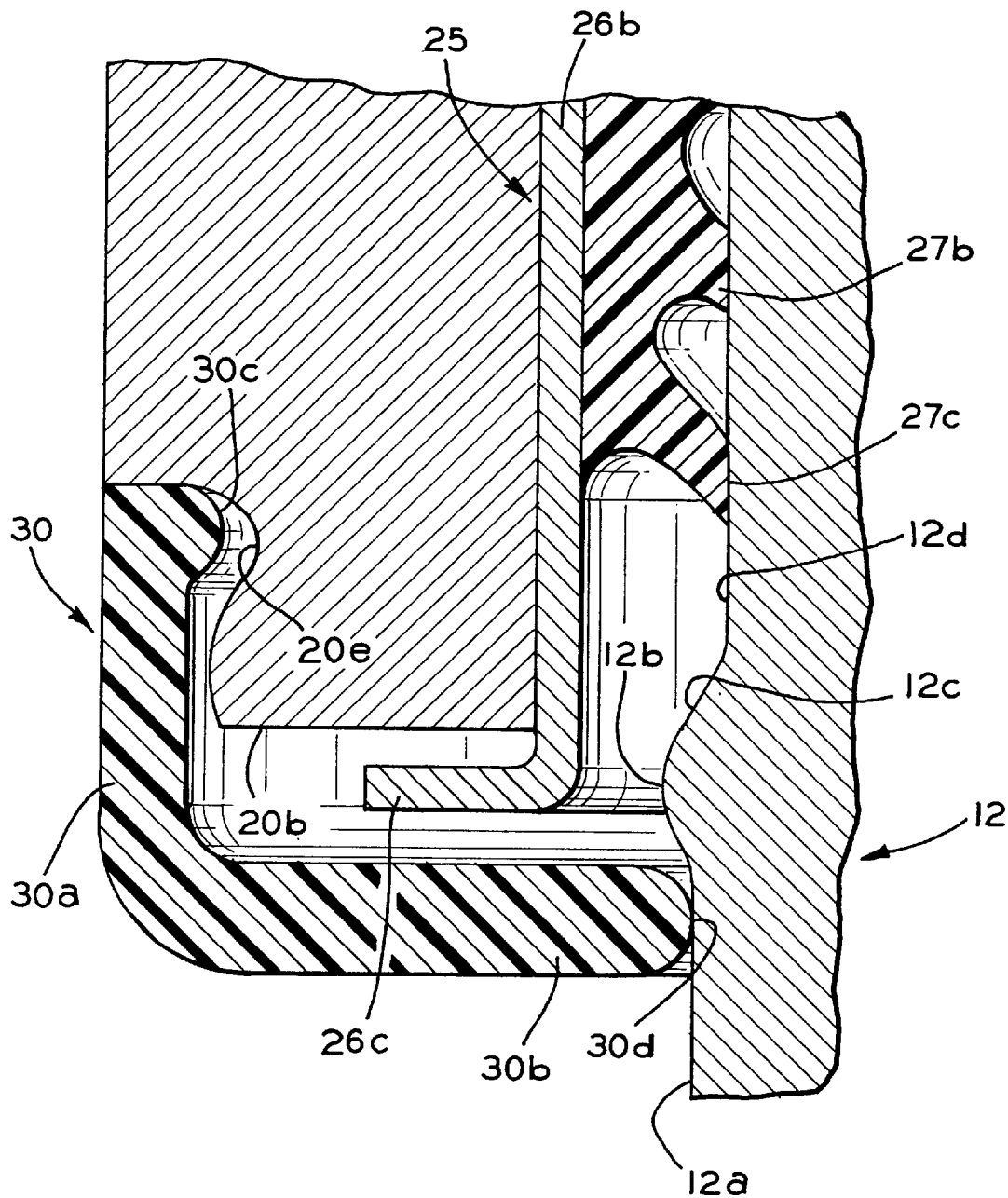
FIG. 3 is an enlarged sectional elevational view of a portion of trunnion of the cross illustrated in FIG. 2.

As illustrated in FIG. 3, the flexible character of the dust guard 30 permits axial displacement of the radially extending portion 30b of the dust guard 30, as well as radial displacement of the axially extending portion 30a of the dust guard 30. As the dust guard 30 is mounted about the trunnion 12, the radially extending portion 30b is advanced towards the crest of the annular ridge 12b. As the radially extending portion 30b is advanced towards the crest, the radially extending portion 30b flexes axially outwardly and away from the body portion 11 of the cross 10. As the radially extending portion 30b reaches the crest, the axially extending portion 30a flexes radially outwardly. As the radially extending portion 30b is advanced beyond the crest, the radially extending portion 30b flexes axially inward towards the body portion 11 of the trunnion 12. At this juncture, the radially extending portion 30b returns to a position substantially perpendicular to the friction surface 12a of the trunnion 12 and the axially extending portion 30a resumes a position substantially parallel to an axis defined by the trunnion 12. The friction surface 30d of the dust guard 30 frictionally engages the friction surface 12a of the trunnion 12. A tight frictional contact is achieved because the inner diameter of the friction surface 30d of the dust guard 30 is slightly smaller than the outer diameter of the friction surface 12a of the trunnion 12.

Because of the interference fit between the frictional surface 30d of the dust is guard 30 and the protrusion 12b, and further because of the frictional engagement between the friction surface 30d of the dust guard 30 and the friction surface 12a of the trunnion 12, the dust guard 30 is retained on the trunnion 12 when installed as set forth above. The bearing cup 20 is also retained on the trunnion 12, since the flange 30c of the dust guard 30 extends into the groove 20e of the bearing cup 20. By retaining the bearing cup 20 on the trunnion 12 in this manner, there is generally no need for external straps or other devices to retain the bearing cup 20 on the trunnion 12 when shipping the cross 10 for subsequent installation. Since there is a loose fit between the dust guard 30 and the bearing cup 20 (provided by the clearance between the reduced diameter portion 20e of the bearing cup 20 and the axially extending portion 30a of the dust guard 30 and further between the groove 20e and the flange 30c), the bearing cup 20 is free to rotate relative to the dust guard 30 without interference with dust guard 30, even after installation.

Although the annular ridge 12b has been described and illustrated as being formed in the friction surface 12a at or near the axially outer end thereof, it will be appreciated that the annular ridge 12b may be formed at any other desired location on the trunnion 12. Also, the ridge 12b need not extend completely about the circumference of the trunnion 12, but rather may be formed as one or more discrete portions on the trunnion 12 that are engaged by the inner friction surface 30d of the dust guard 30. Furthermore, although the illustrated ridge 12b is substantially convex in cross sectional shape, other shapes may be used if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross for a universal joint assembly comprising:
   a central body portion;
   a trunnion extending outwardly from said central body portion; and
   a ridge formed on said trunnion, said ridge defining an outer diameter that is larger than an outer diameter defined by a portion of said trunnion extending between said central body portion and said ridge.

2. The cross defined in claim 1 wherein a plurality of trunnions extend outwardly from said central body portion.

3. The cross defined in claim 2 wherein a ridge is formed on each of said trunnions, each of said ridges defining an outer diameter that is larger than an outer diameter defined by portions of said trunnions extending between said central body portion and said ridges.

4. The cross defined in claim 1 wherein said ridge is an annular ridge.

5. The cross defined in claim 1 wherein said trunnion includes a cylindrical outer friction surface that extends axially outwardly from said central body portion, and wherein said ridge is formed in said friction surface.

6. The cross defined in claim 5 wherein said trunnion includes a tapered surface that extends axially outwardly from said ridge.

7. The cross defined in claim 6 wherein said trunnion includes a cylindrical sealing surface that extends axially outwardly from said tapered surface.

8. The cross defined in claim 7 wherein said tapered surface is a first tapered surface, arid wherein said trunnion includes a second tapered surface that extends axially outwardly from said sealing surface.

9. The cross defined in claim 8 wherein said trunnion includes a cylindrical bearing surface that extends axially outwardly from said second tapered surface.

10. The cross defined in claim 1 wherein said ridge defines an outer diameter that is larger than outer diameters defined by portions of said trunnion adjacent to said ridge.

11. A cross for a universal joint assembly comprising:
    a central body portion;
    a trunnion extending outwardly from said central body portion;
    a ridge formed on said trunnion, said ridge defining an outer diameter that is larger than an outer diameter defined by a portion of said trunnion extending between said central body portion and said ridge;
    a bearing cup mounted on said trunnion for relative rotation; and
    a dust guard including an inner friction surface that frictionally engages said portion of said trunnion extending between said central body portion and said ridge.

12. The cross defined in claim 11 wherein a plurality of trunnions extend outwardly from said central body portion.

13. The cross defined in claim 12 wherein a ridge is formed on each of said trunnions, each of said ridges defining an outer diameter that is larger than an outer diameter defined by portions of said trunnions extending between said central body portion and said ridges.

14. The cross defined in claim 11 wherein said ridge is an annular ridge.

15. The cross defined in claim 11 wherein trunnion includes a cylindrical outer friction surface that extends axially outwardly from said central body portion, and wherein said ridge is formed in said friction surface.

16. The cross defined in claim 15 wherein said trunnion includes a tapered surface that extends axially outwardly from said ridge.

17. The cross defined in claim 16 wherein said trunnion includes a cylindrical sealing surface that extends axially outwardly from said tapered surface.

18. The cross defined in claim 17 wherein said tapered surface is a first tapered surface, and wherein said trunnion includes a second tapered surface that extends axially outwardly from said sealing surface.

19. The cross defined in claim 18 wherein said trunnion includes a cylindrical bearing surface that extends axially outwardly from said second tapered surface.

20. The cross defined in claim 11 wherein said ridge defines an outer diameter that is larger than outer diameters defined by portions of said trunnion adjacent to said ridge.

\* \* \* \* \*